United States Patent

[11] 3,559,712

| [72] | Inventor | Henri Verdier |
| | | Beauregard-L'Eveque, France |
| [21] | Appl. No. | 810,676 |
| [22] | Filed | Mar. 26, 1969 |
| [45] | Patented | Feb. 2, 1971 |
| [73] | Assignee | Compagnie Generals Des Etablissements Michelin raison sociale Michelin & Cie Clermont-Ferran (Puy-de-Dome), France |
| [32] | Priority | Mar. 28, 1968 |
| [33] | | France |
| [31] | | 146,050 |

[54] GIANT PNEUMATIC TIRE
8 Claims, 2 Drawing Figs.

[52] U.S. Cl. .................................................. 152/209
[51] Int. Cl. ........................................... B60c 11/08,
B60c 13/00, B60c 9/22
[50] Field of Search ........................................... 152/209,
209D, 352

[56] References Cited
UNITED STATES PATENTS

| 3,296,715 | 3/1960 | Constantakis | 152/209 |
| 3,411,559 | 11/1968 | Verdier | 152/209 |
| 3,457,981 | 7/1969 | Verdier | 152/209 |
| 3,482,616 | 12/1969 | French | 152/209 |

Primary Examiner—Milton Buchler
Assistant Examiner—C.A. Rutledge
Attorney—Brumbaugh, Graves, Donohue & Raymond ABSTRACT: A pneumatic tire is adapted for public works machines by dividing the tread into a center part and two lateral parts. The width of the center part is 50 percent to 80 percent of the width of the tire, and the width of each lateral part is 5 percent to 20 percent of the width of the tire. The outer surface of each lateral part forms an angle of 30° to 50° with the tire axis, and deep circumferential grooves separate each lateral part from the center part and from the adjacent sidewall.

INVENTOR.
HENRI VERDIER

3,559,712

GIANT PNEUMATIC TIRE

BACKGROUND OF THE INVENTION

The present invention relates to pneumatic tires and, more particularly, to novel and highly-effective giant pneumatic tires especially adapted for use on public works machines.

In pursuit of better productivity, many public works machines are operated at ever increasing speeds and with interruptions in their operation that become increasingly shorter. Quite apart from the problems involved in adapting mechanical parts to these conditions of work, the improvement of the performances of tires presents special difficulties. The main difficulty is related to the fact that an appreciable quantity of energy generated by the operation of public worked machinery is converted into heat in the tires and that, as a result, the temperature of the tires gradually approaches a dangerous limit as conditions of work become more severe. This situation is aggravated by the fact that, on public works machines, tires assume the function of shock absorbers and are repeatedly subjected to dynamic overloads.

Radial carcass tires have facilitated an important improvement in the tempo of operations of public works machinery. Because of a careful distribution of reinforcements and reduced deformation of the areas of maximum work, especially of the tread, internal frictions and thus heating have been reduced under given conditions of work, and it is therefore possible for the tires to endure more severe working conditions while friction and heating remain within tolerable limits.

SUMMARY OF THE INVENTION

An object of the present invention is to reduce further the internal heating of tires used on public works machines and, consequently, to make it possible to use them at greater speeds and during longer continuous periods. The invention applies especially to radial-carcass-type tires, since such tires are capable of definitely better performance than crossed-carcass-type tires.

The tire for public works machines in accordance with the invention is characterized in that its tread comprises a combination of a center part and two lateral parts. The center part has a width which ranges from approximately 50 percent to 80 percent of the maximum width of the tire cross section and has a transverse curvature which is less than the longitudinal curvature. A reinforcement is provided under the center part extending in directions parallel to the rolling surface. Each lateral part has a width ranging from approximately 50 percent to 20 percent of the width of the tire cross section, and its outer surface, when the tire is inflated and unloaded, has an average inclination ranging from 30° to 50° with respect to the axis of the tire. The lateral parts are not reinforced, or they are substantially less reinforced than the center part, and they are separated from the center part and from the sidewalls respectively adjacent thereto by circumferential grooves deep enough to extend through the major portion of the thickness of the tread.

A tire constructed in accordance with the invention thus comprises a tread formed by a comparatively narrow, rigid, cylindrical center portion and two conical lateral portions which are elastic and relatively articulated at their lateral junctures.

The advantages of this structure are considerable. In the absence of a dynamic or static overload, only the center part of the tread, occupying approximately two thirds of its total width, is in contact with the ground and is subjected to intense stress. In case of an overload, especially a dynamic one, the lateral parts of the tread engage the ground and cooperate with the center part. However, the lateral parts are added to the center part and do not partially substitute for it. It is the difference in rigidity between the center part and the lateral parts of the tread which facilitates this result. In the absence of a rigid reinforcement of the center part, the supplementary flexing of the tire caused by an increase in the load would result in that mainly the lateral parts of the tire would tend to bear down on the ground, as if the tire were underinflated. In a tire constructed in accordance with the invention, the center part of the tread works in a way that may be compared to the classical radial tire, and the lateral portions, which are flexibly linked to the sidewalls and to the center portion, are subjected to less stress and heating. It has been found that, for given standard working conditions, the temperature at the ends of the reinforcement plies of the tread was 15° C to 20° C below the temperature recorded for conventional tires.

In view of the fact that the invention requires rigidification of the center portion of the tread in order to avoid an inversion of the transverse curvature thereof when the side portions come to rest on the ground, its application is to radial-carcass-type tires above all.

In accordance with some preferred provisions:

a. The lateral portions of the tread are inclined at an angle of approximately 40° with respect to the axis of the tire. This magnitude of the angle has been found to be preferable in order to facilitate gradual widening of the portion of the tread in contact with the ground.

b. The portions of the sidewalls immediately adjacent to the lateral parts of the thread ad are inclined at an angle of close to 70° with respect to the axis of the tire. This is the inclination which most reduces the danger that lateral zones with comparatively little reinforcement will be injured by stones or other obstacles hit by the tire.

c. The center part of the tread is divided by three or four circumferential grooves the transverse separation of which increases in a direction towards the center from each edge. The four or five ridges thus delimited are cut transversely by cross grooves that are preferably more numerous in the center but of lesser depth. These arrangements make it possible to obtain a highly jointed and divided tread which heats up less.

BRIEF DESCRIPTION OF THE DRAWING

An understanding of additional aspects of the invention can be gained by a consideration of the following detailed description of a representative embodiment thereof, in conjunction with the attached drawings, wherein.

DESCRIPTION OF THE PREFERRED EMBODIMENT

Figure 1:
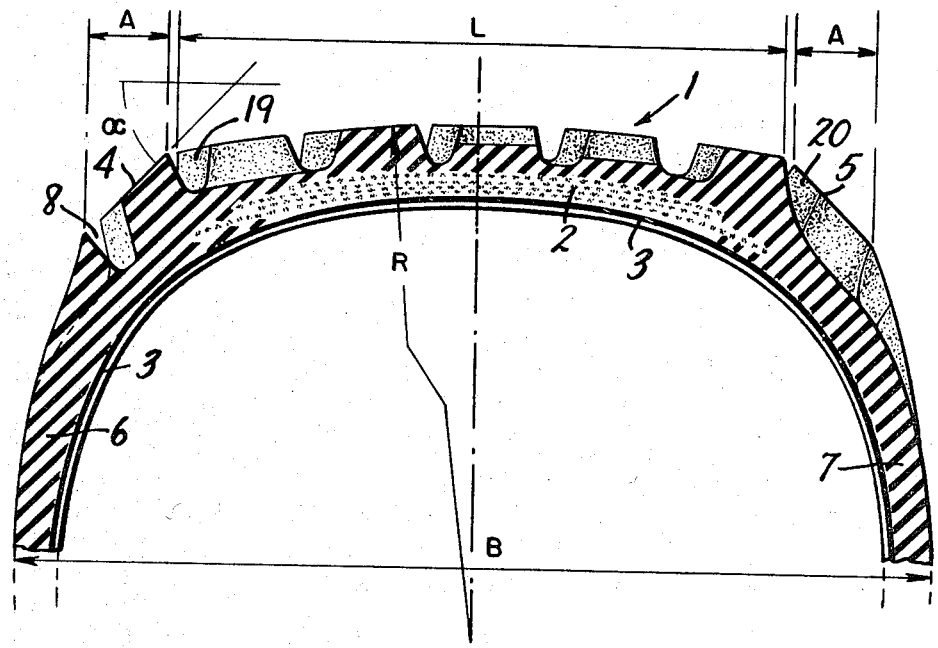
FIG. 1 is a partial cross section along a plane passing through the axis of a tire in accordance with the invention.
Figure 2:
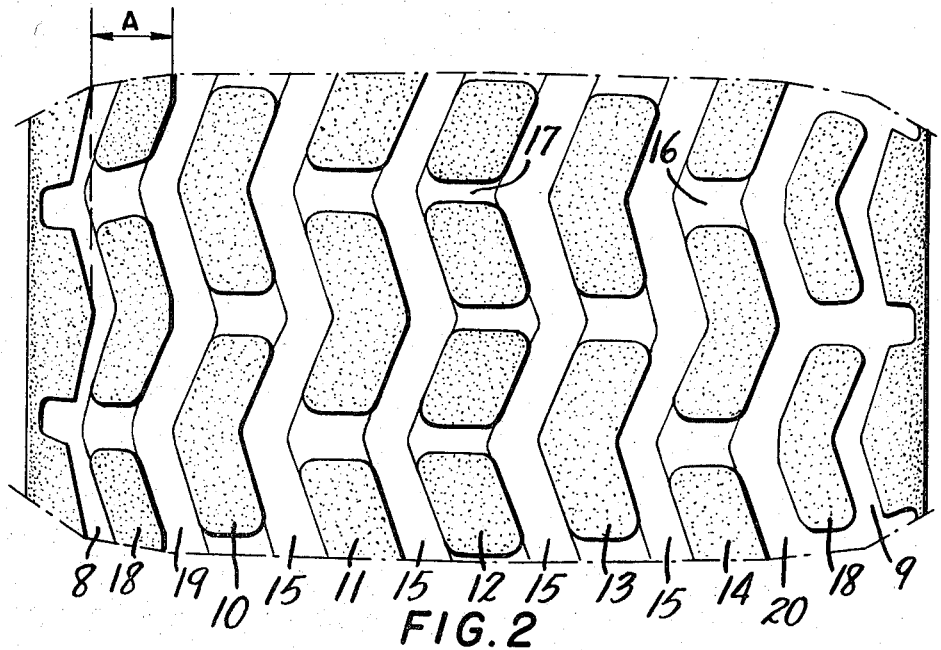
FIG. 2 is a plan view of part of the tread of the tire of FIG. 1 between two radial planes of the tire forming an angle of 22½°

The FIGS. pertain to a 33.5 × 35 tire with a rolling diameter of approximately 2200 mm. The tread 1 of the tire comprises a center part the width L of which is essentially two thirds the maximum width B of the tire. The center part is slightly curved and its radius of curvature R is approximately 3500 mm over most of its width, i.e., more than double the rolling radius which is only approximately 1100 mm. The tread 1 is stiffened by a peak reinforcement 2 consisting of four plies of steel cords placed on a carcass composed of radial cords 3. As may be observed especially in FIG. 2, the center part of the tread is divided into five circumferential rows of blocks of rubber 10, 11, 12, 13 and 14. The middle blocks 12 are a little wider than the adjacent blocks 11 and 13 which latter in turn are a little wider than the blocks 10 and 14. The rows of blocks are separated by four circumferential zigzag grooves 15 which are essentially identical. The blocks in each row are separated by cross or transverse grooves 16 having the same depth as the grooves 15. Moreover, the blocks 12 are separated from one another by cross grooves 17 which are more numerous and less deep than the grooves 16.

The tread comprise furthermore two lateral parts 4 and 5 comprising circumferential rows of blocks 18. When the tire is inflated and unloaded, the surface of each of the lateral portions 4 and 5 forms an angle of 41° with the axis of rotation of the tire. The lateral parts 4 and 5 are separated from the sidewalls 6 and 7 by deep circumferential grooves 8 and 9 running zigzag which penetrate to within a short distance from the radial cords 3. The peak reinforcement 2 does not extend laterally beyond the circumferential grooves 19 and 20 separating the center part L of the tread from the lateral parts 4 and 5. The width A of the lateral parts 4 and 5 measured parallel to the axis of the tire from the inner edge of a block 18 to the edge of the sidewall 6 or 7 is approximately 10 percent of the maximum width B of the tire.

The grooves 8 and 9 as well as 19 and 20 ensure good transverse articulation of the tread in its lateral portions 4 and 5 as well as a good elastic uncoupling of the sidewalls and the tread which permits rolling with less heating up. The similar uncoupling of the center portion 1 of the tread complements the effect. The rigid crown reinforcement 2 that extends underneath the center part 1, however, prevents inversion of the transverse curvature of this part of the tread.

It has been found that the temperature of the rubber at points adjacent to the edges of the peak reinforcement 2 is, under given standard conditions, approximately 15° C to 20° C less than if the tread portions 4 and 5 form a prolongation of portion 1 and are provided with a molding such as is customary for this size of the tire.

Thus, there is provided in accordance with the invention a novel and highly-effective tire of the radial-carcass-type for public works machines. Many modifications in form and detail of the representative embodiment disclosed herein will readily occur to those skilled in the art. Accordingly, the invention is to be construed as including all of the embodiments thereof within the scope of the appended claims.

I claim:

1. A pneumatic tire for public works machines comprising a pair of sidewalls and a tread connected to and extending between said sidewalls, said tread having a center part and two lateral parts, said center part having a width, measured parallel to the tire axis, within the range of 50 percent to 80 percent of the maximum width of said tire and having a transverse curvature less than the longitudinal curvature and each lateral part having a width, measured parallel to the tire axis, within the range of 5 percent to 20 percent of the maximum width of said tire, having its outer surface inclined at an angle within the range of 30° to 50° with respect to the axis of said tire when said tire is inflated and unloaded, and being separated from said center part and from the adjacent sidewall by circumferential grooves, said circumferential grooves having a depth greater than half the thickness of said tread, further comprising rigidifying means under and parallel to said center part, said lateral parts being substantially free of said rigidifying means.

2. A tire according to claim 1 wherein said center part width is substantially 65 percent of said maximum tire width.

3. A tire according to claim 1 wherein said angle is substantially 40°.

4. A tire according to claim 1 wherein the portions of said sidewalls immediately adjacent to said lateral parts are inclined at an angle of substantially 70° with respect to the axis of said tire when said tire is inflated and unloaded.

5. A tire according to claim 1 wherein said center part is formed with at least three circumferential grooves, the spacing between adjacent ones of said center circumferential grooves increasing from the edges of said center part towards the middle thereof.

6. A tire according to claim 1 wherein said center and lateral parts are formed with transverse grooves, said grooves being more numerous adjacent to the middle of said center part.

7. A tire according to claim 1 wherein said center and lateral parts are formed with transverse grooves, said grooves being shallower adjacent to the middle of said center part.

8. A tire according to claim 1, wherein said center part is formed with at least four circumferential rows of blocks the width of which decreases from the middle of the center part to the edges thereof.

PO-1050
(5/69)

UNITED STATES PATENT OFFICE
CERTIFICATE OF CORRECTION

Patent No. 3,559,712                    Dated February 2, 1971

Inventor(s) Henri Verdier

It is certified that error appears in the above-identified patent and that said Letters Patent are hereby corrected as shown below:

Col. 1, line 16, "worked" should read -- works --;

Col. 1, line 49, "50%" should read -- 5% --;

Col. 2, line 24, delete "ad"; and

Col. 2, line 72, "comprise" should read -- comprises --.

Signed and sealed this 10th day of August 1971.

(SEAL)
Attest:

EDWARD M. FLETCHER, JR.                 WILLIAM E. SCHUYLER, JR.
Attesting Officer                       Commissioner of Patents